United States Patent
Wang et al.

(10) Patent No.: US 10,011,951 B2
(45) Date of Patent: Jul. 3, 2018

(54) METHOD FOR PRODUCING META-ARAMID FIBER PAPER-BASED MATERIAL

(71) Applicant: Yantai Metastar Special Paper Co., Ltd., Yantai, Shandong (CN)

(72) Inventors: Zhixin Wang, Shandong (CN); Jing Sun, Shandong (CN); Ming Jiang, Shandong (CN); Yanlei Sun, Shandong (CN); Junbo Deng, Shandong (CN)

(73) Assignee: Yantai Metastar Special Paper Co., Ltd., Yantai, Shandong (CN)

( * ) Notice: Subject to any disclaimer, the term of this patent is extended or adjusted under 35 U.S.C. 154(b) by 0 days.

(21) Appl. No.: 15/360,711

(22) Filed: Nov. 23, 2016

(65) Prior Publication Data

US 2017/0073896 A1    Mar. 16, 2017

(30) Foreign Application Priority Data

Aug. 30, 2016    (CN) .......................... 2016 1 0769755

(51) Int. Cl.
| | | |
|---|---|---|
| *D01D 5/04* | (2006.01) | |
| *D21H 13/26* | (2006.01) | |
| *D21H 19/84* | (2006.01) | |
| *D21H 19/10* | (2006.01) | |
| *D21H 27/00* | (2006.01) | |
| *D01F 6/60* | (2006.01) | |
| *D01F 1/10* | (2006.01) | |
| *C08L 77/10* | (2006.01) | |
| *B29C 43/24* | (2006.01) | |
| *D01F 1/07* | (2006.01) | |
| *B29K 77/00* | (2006.01) | |
| *B29L 7/00* | (2006.01) | |

(52) U.S. Cl.
CPC ............. *D21H 13/26* (2013.01); *B29C 43/24* (2013.01); *C08L 77/10* (2013.01); *D01D 5/04* (2013.01); *D01F 1/10* (2013.01); *D01F 6/605* (2013.01); *D21H 19/10* (2013.01); *D21H 19/84* (2013.01); *D21H 27/00* (2013.01); *B29K 2077/10* (2013.01); *B29L 2007/002* (2013.01); *C08L 2201/02* (2013.01); *C08L 2201/08* (2013.01); *C08L 2201/56* (2013.01); *C08L 2203/12* (2013.01); *D01F 1/07* (2013.01)

(58) Field of Classification Search
USPC ........................................................ 162/136
See application file for complete search history.

(56) References Cited

U.S. PATENT DOCUMENTS

| 4,698,267 A * | 10/1987 | Tokarsky ............... | D21H 13/26 162/146 |
| 4,729,921 A * | 3/1988 | Tokarsky ............... | D21H 13/26 162/146 |
| 5,622,775 A * | 4/1997 | Burks, Jr. ................. | B32B 5/26 442/392 |
| 7,455,750 B2 * | 11/2008 | Conley ................... | D21H 13/26 162/157.3 |
| 7,727,358 B2 * | 6/2010 | Amma ................... | C09K 3/1028 162/141 |
| 7,803,247 B2 * | 9/2010 | Levit ...................... | D21H 13/10 162/123 |
| 8,114,251 B2 * | 2/2012 | Levit ...................... | D21H 31/10 162/138 |
| 8,444,813 B2 * | 5/2013 | Zhong ................... | D21F 1/0018 162/138 |
| 2005/0284595 A1 * | 12/2005 | Conley ................... | D21H 13/02 162/146 |
| 2006/0266486 A1 * | 11/2006 | Levit ...................... | D21H 13/26 162/146 |
| 2007/0137817 A1 * | 6/2007 | Amma ................... | C09K 3/1028 162/146 |
| 2007/0144695 A1 * | 6/2007 | Amma ................ | C04B 16/0608 162/146 |
| 2012/0168983 A1 * | 7/2012 | Zhong .................... | C08G 69/32 264/184 |
| 2012/0227919 A1 * | 9/2012 | Zhong ................... | D21F 1/0018 162/157.3 |

* cited by examiner

*Primary Examiner* — Mark Halpern (57) ABSTRACT

A method for producing a meta-aramid fiber paper-based material includes steps of: adding functional powders into a first poly(m-phenylene isophthalamide) solution, and obtaining a homogeneous mixed solution; through a dry spinning method, obtaining meta-aramid chopped fibers; through a second poly(m-phenylene isophthalamide) solution, obtaining meta-aramid fibrids; processing the fibrids with a multi-stage classification, selecting the fibrids having an appropriate mesh number and combining in proportion; mixing the chopped fibers and the fibrids, and relieving until uniform; forming a paper through an ultralow concentration inclined wire forming machine with an ultrasonic process and a wet-papermaking process; after squeezing and drying, obtaining a meta-aramid fiber base paper, and then processing with surface coating; and, after multi-stage calendering, rewinding and slitting, obtaining the high-performance meta-aramid fiber paper-based material. The paper-based material has a thickness of 1.5-30 mil, a high whiteness, a smooth and even surface, excellent characteristics, and a good performance stability.

8 Claims, 1 Drawing Sheet

METHOD FOR PRODUCING META-ARAMID FIBER PAPER-BASED MATERIAL

CROSS REFERENCE OF RELATED APPLICATION

The application claims priority under 35 U.S.C. 119(a-d) to CN 201610769755.7, filed Aug. 30, 2016.

BACKGROUND OF THE PRESENT INVENTION

Field of Invention

The present invention relates to a crossing field between paper industry and insulation industry, and more particularly to a method for producing a meta-aramid fiber paper-based material.

Description of Related Arts

The meta-aramid fiber paper-based material is a whole-polyamide synthetic material which is prepared with raw materials of meta-aramid chopped fibers and meta-aramid fibrids through the wet-papermaking process and calendering process. Because of the high strength, the high modulus, the light weight, the flame retardancy, the high-temperature resistance, the corrosion resistance and the excellent dielectric property, the meta-aramid fiber paper-based material as the insulating material and the honeycomb core material is widely applied in the important fields of aerospace, rail transit and electrical insulation, and is the indispensable basic material of the modern industry.

As the important strategic reserve material and the high-tech material, the meta-aramid fiber paper-based material has been researched for a long time by experts and scholars. The American patent publication, U.S. Pat. No. 8,444,813, disclosed a method for preparing a meta-aramid fiber paper-based material, comprising steps of: adopting chopped fibers having a weight of 30-80% of a total absolute dry weight and fibrids having a weight of 20-70% of the total absolute dry weight as raw materials, forming a paper through an inclined wire forming machine with a wet-papermaking process, and, through two-stage drying, obtaining the meta-aramid fiber paper-based material. According to the Chinese patent application, CN200610043659.0, 5-95 wt % of the chopped fibers and 5-95 wt % of the fibrids were adopted as the raw materials; then, the meta-aramid fiber base paper was prepared through the wet-papermaking process; next, functional nanoparticles were precoated on the surface of the meta-aramid fiber base paper, and the precoated meta-aramid fiber base paper was processed with high-temperature calendering; and finally, the high-performance meta-aramid fiber paper-based material was obtained. According to the Chinese patent application, CN200510049055.2, at least one end surface of the meta-aramid chopped fibers was processed with fibril dividing, so that the specific surface area was increased; then, the processed meta-aramid chopped fibers were uniformly mixed with the meta-aramid fibrids; after forming a paper through the wet-papermaking process, the formed paper was processed with high-temperature calendering; and finally, the meta-aramid fiber paper-based material product having the excellent mechanical strength was obtained.

With the rapid development of science and technology, in the application process, the meta-aramid fiber paper-based material always faces tests of various bad working conditions, such as the high and low temperature, the high voltage, and the high light radiation, which puts forward higher and higher requirements on the overall performance, such as characteristics of surface smoothness, mechanical strength, dielectric property, and aging resistance, and the performance stability of the meta-aramid fiber paper-based material. Thus, for better meeting the development requirements of the modern industry, it is necessary to continuously adopt the new technology to improve the quality and the performance of the meta-aramid fiber paper-based material product.

Firstly, the meta-aramid fiber paper-based material is a photosensitive high polymer material, which is easy to be aged and degraded under conditions such as the ultraviolet irradiation and the high-temperature environment, and finally causes the yellowing paper and the great decrease of the overall performance. Moreover, because the meta-aramid fiber paper-based material is applied in the fireproof material, the flame retardancy thereof is required to be improved. The Chinese patent application, CN201110032074.X, disclosed a method for preparing an additive meta-aramid fiber paper-based material. During the preparation stage of the meta-aramid fibrids, the silica, the clay, the carbon black, the titanium oxide, the zirconium oxide, and the resin functional powders were added, which improved the aging resistance of the meta-aramid fiber paper-based material. However, the added functional powders always had the serious side effects on the mechanical performance of the fibers and the paper-based material thereof. Thus, it is required to develop a new additive system, which is able to improve the aging resistance and the flame retardancy of the meta-aramid fiber paper-based material, without generating any negative effect on the other useful performances.

Secondly, the meta-aramid fiber paper-based material is more and more applied in the high-strength lightweight honeycomb structure material, and thus the mechanical strength thereof is urgently required to be further increased. According to the Chinese patent application, CN200810134636.X, 0-19 wt % of the polyester fibers were added, and, after the wet-papermaking process and calendering, the meta-aramid fiber paper-based material was prepared, which greatly increased the mechanical strength thereof. However, the introduction of the third ingredient caused a great decrease of the performance of the meta-aramid fiber paper-based material, such as the high-temperature resistance and the flame retardancy, which limited the popularization and the application of the meta-aramid fiber paper-based material.

Next, the fluff problem exists on the surface of the meta-aramid fiber paper-based material, causing the burrs generating in the subsequent machining process such as dipping and paint spraying, thereby leading to the local concentration of the field intensity in the high-voltage environment and the instantaneous breakdown phenomenon, and seriously threatening the safe operation of the electrical equipment. Thus, the surface smoothness of the meta-aramid fiber paper-based material is required to be improved. The American patent publication, U.S. Pat. No. 5,622,775, disclosed a multi-layered papermaking technology. The surface layer consisted of 10-35% by weight of the chopped fibers and 65-90% by weight of the fibrids, and the inner layer consisted of 45-60% by weight of the chopped fibers and 40-55% by weight of the fibrids. Through processing with composite squeezing and drying, and finally with calendering, the meta-aramid fiber paper-based material having the high smoothness was obtained. However, to realize the multi-layered papermaking technology, the three-inclined-wire papermaking machine was required. Thus, the equipment requirement is relatively high, the production process is complex, and the production cost is high.

Finally, the demands on the thick (6-30 mil) meta-aramid fiber paper-based material in the electrical insulation field is bigger and bigger, while the related research reports of the thick meta-aramid fiber paper-based material are few. Because of the relatively high basic weight (150-700 g/cm$^2$) of the thick meta-aramid fiber paper-based material, the conventional single-layer or multi-layer papermaking machine is difficult to meet the production requirements, and thus the production difficulty is relatively high. Conventionally, in the actual production of the thick meta-aramid fiber paper-based material, the multi-layer base paper dry pressing technology is generally adopted. However, blistering and delamination easily occur, and the interlayer bonding strength is relatively low. Meanwhile, the meta-aramid fiber paper-based material has the relatively bad performance stability, and the products from batch to batch and the products in the same batch have the relatively high performance fluctuation which are urgently required to be solved.

SUMMARY OF THE PRESENT INVENTION

An object of the present invention is to provide a method for producing a meta-aramid fiber paper-based material. The meta-aramid fiber paper-based material prepared through the present invention has a thickness in a range of 1.5-30 mil, a high whiteness, a smooth and even surface, excellent characteristics of mechanical strength, dielectric property, aging resistance and flame retardancy, and a good performance stability.

In order to accomplish the above object, the present invention adopts following technical solutions.

A method for producing a meta-aramid fiber paper-based material comprises steps of:

(1) mixing functional powders with a dimethylacetamide (DMAC) solution, and grinding a mixture of the functional powders and the DMAC solution; adding the ground mixture into a first poly(m-phenylene isophthalamide) solution; and obtaining a mixed original liquid through a static mixer;

(2) processing the mixed original liquid through a dry spinning method, and respectively obtaining first meta-aramid chopped fibers having a length of 4-10 mm and a fineness of 1.5-2.5 D, and second meta-aramid chopped fibers having a length of 1-3 mm and a fineness of 0.5-1.0 D; and, respectively relieving the first meta-aramid chopped fibers and the second meta-aramid chopped fibers until concentrations thereof are 0.05-0.5%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids in proportion; stirring the combined fibrids hydraulically, and relieving the fibrids until concentrations thereof are 0.05-0.5%;

(4) mixing the meta-aramid fibrids having a weight of 15-65% of a total absolute dry weight, the first meta-aramid chopped fibers having a weight of 15-65% of the total absolute dry weight, and the second meta-aramid chopped fibers having a weight of 10-20% of the total absolute dry weight; and obtaining a meta-aramid fiber mixed pulp having a concentration of 0.05-0.5%;

(5) processing the meta-aramid fiber mixed pulp with a wet-papermaking process through an ultralow concentration inclined wire forming machine, wherein an ultrasonic process proceeds inside the forming machine and an on-wire concentration is 0.005-0.02%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid; absolutely drying the base paper, and obtaining a coated meta-aramid fiber base paper; and (7) processing the coated meta-aramid fiber base paper respectively with soft calendering, high-temperature calendering, and cold calendering, then rewinding and slitting the processed base paper, and obtaining a meta-aramid fiber paper-based material having a thickness of 1.5-5 mil; alternatively, laminating multiple layers of meta-aramid fiber base paper, wherein an inner layer is an uncoated meta-aramid fiber base paper and a surface layer is the coated meta-aramid fiber base paper, then humidifying, soft calendering, absolutely drying through a hot air pipe, high-temperature calendering, cold calendering, rewinding and slitting, and finally obtaining a meta-aramid fiber paper-based material having a thickness of 6-30 mil.

Preferably, the functional powders are powders having a particle size smaller than 200 nm, and a total addition amount of the functional powders is 0.1-5% of a weight of poly(m-phenylene isophthalamide).

Further preferably, the functional powders are metallic oxides, and metallic ions comprise at least one member selected from a group consisting of aluminum ions, titanium ions, palladium ions, zirconium ions, and bismuth ions.

Preferably, the meta-aramid fibrids respectively having the size of ≤30 meshes, 30-50 meshes, 50-100 meshes, and 100-150 meshes are combined with a weight proportion of (0-2): (1-3): (3-7): (1-5).

Preferably, the first meta-aramid chopped fibers are high-strength high-modulus fibers with a modulus of 60-80 cN/dtex, and the second meta-aramid chopped fibers are as-spun fibers with a modulus of 30-55 cN/dtex.

Preferably, the ultrasonic process in the ultralow concentration inclined wire forming machine proceeds with a power of 800-3000 W.

Preferably, a coating basic weight is 5-15 g/cm$^2$, and a covering area is ≥95%.

Preferably, the meta-aramid fibrids for coating have a size ≤150 meshes.

Preferably, the laminated multiple layers of meta-aramid fiber base paper are humidified until a water content thereof is 10-30%.

Preferably, soft calendering proceeds with a temperature of 80-180° C. and a linear pressure of 100-200 kN/m; high-temperature calendering proceeds with a temperature of 250-300° C. and a linear pressure of 200-400 kN/m; and cold calendering proceeds with a temperature of 0-20° C. and a linear pressure of 50-100 kN/m.

Compared with prior art, the present invention has following beneficial technical effects.

Through adding the functional powders into the fibers, the method provided by the present invention obviously increases the whiteness and the aging resistance of the meta-aramid fiber paper-based material. Through the multi-stage classification of the fibrids, the meta-aramid fibrid pulp having stable components is prepared, which is beneficial to increasing the performance stability of the paper-based material. Through adding superfine meta-aramid as-spun fibers, namely the second meta-aramid chopped fibers, the mechanical strength of the paper-based material is increased. Through processing the base paper with surface coating, the meta-aramid fiber paper having a smooth and clean surface and an excellent insulation performance is prepared. Meanwhile, through technologies of laminating, humidifying and calendering, the thick meta-aramid fiber paper is prepared and the mechanical strength and the dielectric property thereof are greatly increased. The present invention provides a complete set of the production method of the papermaking meta-aramid fiber pulp and the paper-based material thereof. The prepared meta-aramid fiber paper-based material has the thickness in the range of 1.5-30 mil, the high whiteness, the smooth and even surface, the excellent characteristics of mechanical strength, dielectric property, aging resistance and flame retardancy, and the good performance stability, which has the particularly important practical significance on leading the upgradation of the electrical insulation field, promoting the development of the aerospace and high-speed train field, and increasing the production level and the application scale of the meta-aramid fiber paper-based material.

These and other objectives, features, and advantages of the present invention will become apparent from the following detailed description, the accompanying drawings, and the appended claims.

DETAILED DESCRIPTION OF THE PREFERRED EMBODIMENT

Figure 1:
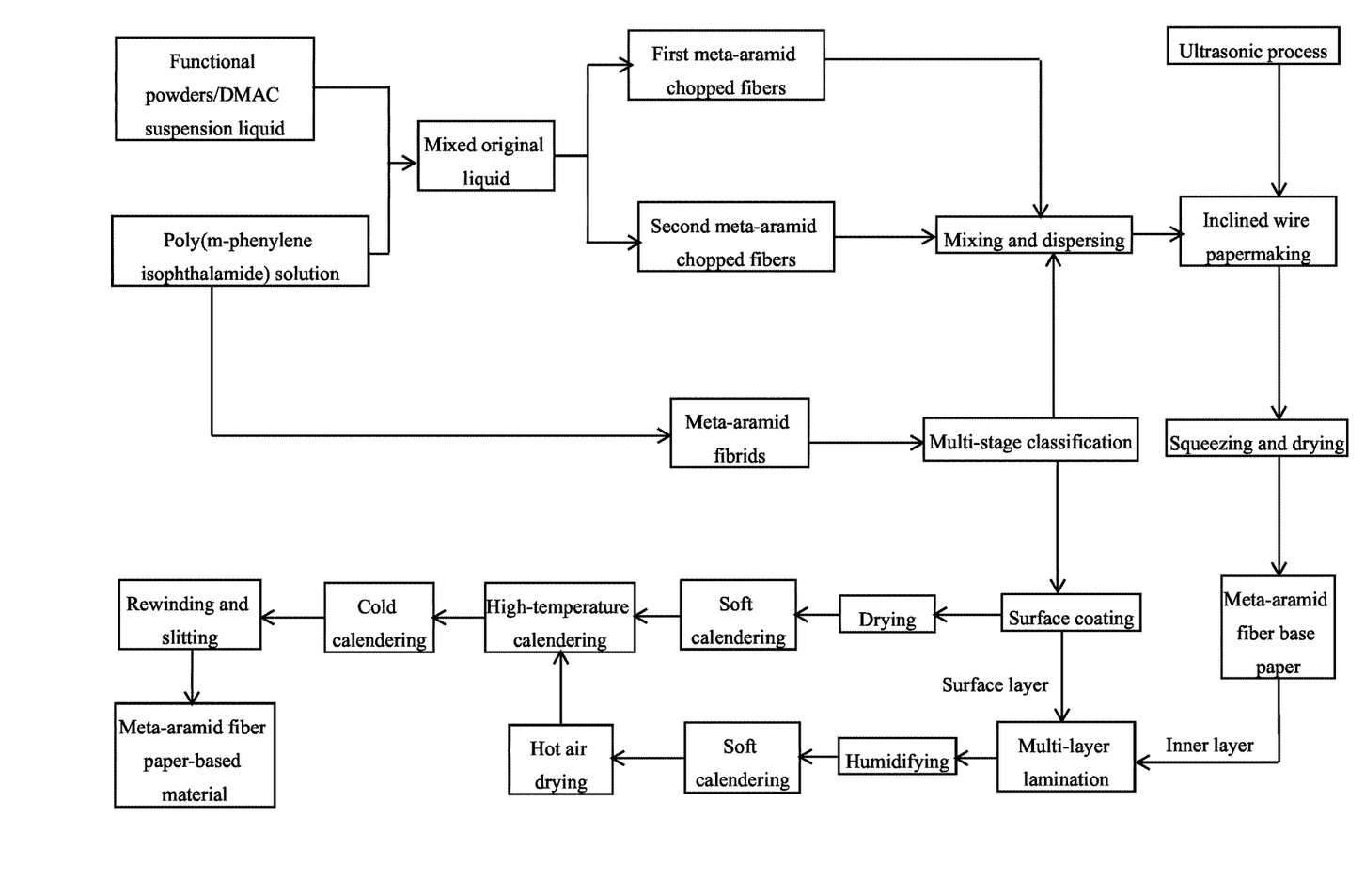
The FIGURE is a process flow chart of a method for producing a meta-aramid fiber paper-based material according to preferred embodiments of the present invention.

The present invention provides a method for producing a meta-aramid fiber paper-based material, as shown in the FIGURE, comprising steps of:

(1) mixing functional powders with a dimethylacetamide (DMAC) solution, and grinding a mixture of the functional powders and the DMAC solution; adding the ground mixture into a first poly(m-phenylene isophthalamide) solution; and obtaining a mixed original liquid through a static mixer;

(2) processing the mixed original liquid through a dry spinning method, and respectively obtaining first meta-aramid chopped fibers (high-strength high-modulus fibers) having a length of 4-10 mm and a fineness of 1.5-2.5 D, and second meta-aramid chopped fibers (as-spun fibers) having a length of 1-3 mm and a fineness of 0.5-1.0 D; and, respectively relieving the first meta-aramid chopped fibers and the second meta-aramid chopped fibers until concentrations thereof are 0.05-0.5%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids in proportion; stirring the combined fibrids hydraulically, and relieving the fibrids until concentrations thereof are 0.05-0.5%;

(4) mixing the meta-aramid fibrids having a weight of 15-65% of a total absolute dry weight, the first meta-aramid chopped fibers having a weight of 15-65% of the total absolute dry weight, and the second meta-aramid chopped fibers having a weight of 10-20% of the total absolute dry weight; and obtaining a meta-aramid fiber mixed pulp having a concentration of 0.05-0.5%;

(5) processing the meta-aramid fiber mixed pulp with a wet-papermaking process through an ultralow concentration inclined wire forming machine, wherein an ultrasonic process proceeds inside the forming machine and an on-wire concentration is 0.005-0.02%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid; absolutely drying the base paper, and obtaining a coated meta-aramid fiber base paper; and (7) processing the coated meta-aramid fiber base paper respectively with soft calendering, high-temperature calendering, and cold calendering, then rewinding and slitting the processed base paper, and obtaining a meta-aramid fiber paper-based material having a thickness of 1.5-5 mil; alternatively, laminating multiple layers of meta-aramid fiber base paper, wherein an inner layer is an uncoated meta-aramid fiber base paper and a surface layer is the coated meta-aramid fiber base paper, then humidifying, soft calendering, absolutely drying through a hot air pipe, high-temperature calendering, cold calendering, rewinding and slitting, and finally obtaining a meta-aramid fiber paper-based material having a thickness of 6-30 mil.

The present invention is further described in detail with following preferred embodiments.

First Preferred Embodiment (1) mixing functional powders with a DMAC solution, and grinding a mixture of the functional powders and the DMAC solution; forming a suspension liquid which is uniformly dispersed; adding the suspension liquid into a first poly(m-phenylene isophthalamide) solution; and obtaining a mixed original liquid through a static mixer; wherein: the functional powders are titanium oxides having a particle size smaller than 200 nm, and a total addition amount of the functional powders is 0.1% of a weight of poly(m-phenylene isophthalamide);

(2) processing the mixed original liquid through a dry spinning method, and respectively obtaining first meta-aramid chopped fibers (high-strength high-modulus fibers) having a length of 4 mm, a fineness of 1.5 D, and a modulus of 60 cN/dtex, and second meta-aramid chopped fibers (as-spun fibers) having a length of 1 mm, a fineness of 0.5 D, and a modulus of 40 cN/dtex; and, respectively relieving the first meta-aramid chopped fibers and the second meta-aramid chopped fibers until concentrations thereof are 0.05%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids with a weight proportion of 0:1:7:2; stirring the combined fibrids hydraulically, and relieving the fibrids until concentrations thereof are 0.05%;

(4) mixing the meta-aramid fibrids having a weight of 65% of a total absolute dry weight, the first meta-aramid chopped fibers having a weight of 25% of the total absolute dry weight, and the second meta-aramid chopped fibers having a weight of 10% of the total absolute dry weight; and obtaining a meta-aramid fiber mixed pulp having a concentration of 0.05%;

(5) processing the meta-aramid fiber mixed pulp with a wet-papermaking process through an ultralow concentration inclined wire forming machine, wherein an ultrasonic process proceeds inside the forming machine, a processing power is 3000 W and an on-wire concentration is 0.005%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid having a size ≤150 meshes, a coating basic weight is 5 g/cm$^2$ and a covering area is ≥95%; absolutely drying the base paper, and obtaining a coated meta-aramid fiber base paper; and (7) soft calendering the coated meta-aramid fiber base paper with a temperature of 80° C. and a linear pressure of 100 kN/m, then high-temperature calendering with a temperature of 250° C. and a linear pressure of 200 kN/m, and finally cold calendering with a temperature of 20° C. and a linear pressure of 100 kN/m; rewinding and slitting the calendered base paper, and obtaining a meta-aramid fiber paper-based material having a thickness of 1.5 mil.

Second Preferred Embodiment (1) mixing functional powders with a DMAC solution, and grinding a mixture of the functional powders and the DMAC solution; forming a suspension liquid which is uniformly dispersed; adding the suspension liquid into a first poly(m-phenylene isophthalamide) solution; and obtaining a mixed original liquid through a static mixer; wherein: the functional powders are titanium oxides, aluminum oxides, and bismuth oxides, which have a particle size smaller than 200 nm, the titanium oxides, the aluminum oxides, and the bismuth oxides are mixed with a weight proportion of 1:1:1, and a total addition amount of the functional powders is 1% of a weight of poly(m-phenylene isophthalamide);

(2) processing the mixed original liquid through a dry spinning method, and respectively obtaining first meta-aramid chopped fibers (high-strength high-modulus fibers) having a length of 6 mm, a fineness of 2.0 D, and a modulus of 70 cN/dtex, and second meta-aramid chopped fibers (as-spun fibers) having a length of 2 mm, a fineness of 0.5 D, and a modulus of 30 cN/dtex; and, respectively relieving the first meta-aramid chopped fibers and the second meta-aramid chopped fibers until concentrations thereof are 0.1%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids with a weight proportion of 1:3:4:2; stirring the combined fibrids hydraulically, and relieving the fibrids until concentrations thereof are 0.1%;

(4) mixing the meta-aramid fibrids having a weight of 45% of a total absolute dry weight, the first meta-aramid chopped fibers having a weight of 45% of the total absolute dry weight, and the second meta-aramid chopped fibers having a weight of 10% of the total absolute dry weight; and obtaining a meta-aramid fiber mixed pulp having a concentration of 0.1%;

(5) processing the meta-aramid fiber mixed pulp with a wet-papermaking process through an ultralow concentration inclined wire forming machine, wherein an ultrasonic process proceeds inside the forming machine, a processing power is 1500 W and an on-wire concentration is 0.01%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid having a size ≤150 meshes, a coating basic weight is 6 g/cm$^2$ and a covering area is ≥95%; absolutely drying the base paper, and obtaining a coated meta-aramid fiber base paper; and (7) soft calendering the coated meta-aramid fiber base paper with a temperature of 120° C. and a linear pressure of 120 kN/m, then high-temperature calendering with a temperature of 280° C. and a linear pressure of 270 kN/m, and finally cold calendering with a temperature of 10° C. and a linear pressure of 80 kN/m; rewinding and slitting the calendered base paper, and obtaining a meta-aramid fiber paper-based material having a thickness of 2.0 mil.

In order to improve an aging resistance and a flame retardancy of the meta-aramid fiber paper-based material, metallic oxides are firstly added during a preparation stage of the meta-aramid chopped fibers, wherein metallic ions comprise at least one member selected from a group consisting of aluminum ions, titanium ions, palladium ions, zirconium ions, and bismuth ions. Because the chopped fibers are prepared through the dry spinning method, the functional powders are able to be completely covered inside the fibers or embedded on a surface of the fibers, which has no influence on a papermaking system, leads to maximum characteristics such as a light aging resistance, a thermal aging resistance, and the flame retardancy, and obviously increases a whiteness of the meta-aramid fiber paper-based material. Influences of an addition of the functional powders on performance of the paper-based material are showed in Table 1.

TABLE 1

Influences of addition of functional powders on performance of paper-based material

| | Thickness (mil) | Whiteness (%) | Limited oxygen index (%) | Long-term working temperature (° C.) | Ultraviolet (UV) treatment for 48 h |
|---|---|---|---|---|---|
| Before improvement | 2 | 59 | 29 | 210 | Yellowing |
| After improvement | 2 | 68 | 33 | 220 | Non-yellowing |

In order to increase a mechanical strength of the meta-aramid fiber paper-based material, the present invention adopts a method of adding the superfine meta-aramid as-spun fibers. In a structure of the meta-aramid fiber paper-based material, the chopped fibers after a hot stretch treatment have a high strength and a high modulus, which are able to serve as a framework material to provide an overall mechanical strength, but difficult to be plastically deformed or fused under a high-temperature high-pressure condition, causing a relatively low interface bonding strength among the fibers. The as-spun fibers without processing with the hot stretch treatment have a relatively low strength and modulus, and thus, during a calendering process, are able to well bond with the fibrids, which guarantees a pure composition of the paper-based material, and meanwhile is beneficial to increasing the mechanical strength thereof. Influences of an addition of the second meta-aramid chopped fibers on the performance of the paper-based material are showed in Table 2.

TABLE 2

Influences of addition of second meta-aramid chopped fibers on performance of paper-based material

| | Thickness (mil) | Machine direction (MD) tensile strength (N/cm) | MD elongation (%) | MID tearing strength (mN) |
|---|---|---|---|---|
| Before improvement | 2 | 39.5 | 7.0 | 1350 |
| After improvement | 2 | 43.4 | 9.7 | 1650 |

In order to improve a surface smoothness of the meta-aramid fiber paper-based material, the present invention adopts a surface coating process. In the meta-aramid fiber paper-based material, the fibrids serve as a main bonding material, and the chopped fibers are fixedly embedded therein. A fluff problem on a surface of the paper-based material illustrates that the fibrids on a surface layer are unable to well bond the chopped fibers, and thus the fibrids having a fine size are coated on the surface of the paper-based material for self-melting during a high-temperature high-pressure process, and bonding and covering the chopped fibers on the surface layer. Meanwhile, the present invention obviously increases a dielectric property of the paper-based material. Influences of the surface coating process on the performance of the paper-based material are showed in Table 3.

TABLE 3

Influences of surface coating process on performance of paper-based material

| | Thickness (mil) | Surface smoothness (s) | Dielectric strength (kV/mm) | Fluff phenomenon |
|---|---|---|---|---|
| Before improvement | 2 | 74 | 14.7 | Serious fluff |
| After improvement | 2 | 280 | 18.9 | No fluff |

In order to increase a performance stability of the meta-aramid fiber paper-based material, the present invention adopts a method of processing the meta-aramid fibrids with the multi-stage classification and then combining the fibrids according to size requirements. An unstable performance of the meta-aramid fiber paper-based material is mainly caused by a fluctuation of a production process. A frequent fluctuation of a papermaking machine liquid is mainly due to a great influence of a nonuniform size of the meta-aramid fibrids on filtered water of the pulp during the wet-papermaking process. Thus, a key to improve the performance stability of the meta-aramid fiber paper-based material is to keep the size of the meta-aramid fibrids stable. The present invention processes the meta-aramid fibrids with the multi-stage classification, and selects the fibrids having a suitable mesh number for combining, so that fibrous raw materials keep stable during the wet-papermaking process, which decreases the fluctuation of the performance of the paper-based material and is beneficial to a long-term operation of production. Influences of the multi-stage classification and combination of the fibrids on the performance stability of the paper-based material are showed in Table 4.

TABLE 4

Influences of multi-stage classification and combination of fibrids on performance stability of paper-based material

| | Values of coefficient of variation (CV) | | | |
|---|---|---|---|---|
| | Thickness (mil) | MD tensile strength (N/cm) | MD elongation (%) | Cross direction (CD) tearing strength (mN) | Dielectric strength (kV/mm) |
| Before improvement | 2 | 7.2 | 8.5 | 7.9 | 6.8 |
| After improvement | 2 | 2.4 | 3.1 | 2.7 | 2.0 |

Third Preferred Embodiment (1) mixing functional powders with a DMAC solution, and grinding a mixture of the functional powders and the DMAC solution; forming a suspension liquid which is uniformly dispersed; adding the suspension liquid into a first poly(m-phenylene isophthalamide) solution; and obtaining a mixed original liquid through a static mixer; wherein: the functional powders are aluminum oxides having a particle size smaller than 200 nm, and a total addition amount of the functional powders is 2% of a weight of poly(m-phenylene isophthalamide);

(2) processing the mixed original liquid through a dry spinning method, and respectively obtaining first meta-aramid chopped fibers (high-strength high-modulus fibers) having a length of 7 mm, a fineness of 2.0 D, and a modulus of 70 cN/dtex, and second meta-aramid chopped fibers (as-spun fibers) having a length of 2 mm, a fineness of 0.5 D, and a modulus of 30 cN/dtex; and, respectively relieving the first meta-aramid chopped fibers and the second meta-aramid chopped fibers until concentrations thereof are 0.2%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids with a weight proportion of 1:1:3:5; stirring the combined fibrids hydraulically, and relieving the fibrids until concentrations thereof are 0.2%;

(4) mixing the meta-aramid fibrids having a weight of 40% of a total absolute dry weight, the first meta-aramid chopped fibers having a weight of 45% of the total absolute dry weight, and the second meta-aramid chopped fibers having a weight of 15% of the total absolute dry weight; and obtaining a meta-aramid fiber mixed pulp having a concentration of 0.2%;

(5) processing the meta-aramid fiber mixed pulp with a wet-papermaking process through an ultralow concentration inclined wire forming machine, wherein an ultrasonic process proceeds inside the forming machine, a processing power is 800 W and an on-wire concentration is 0.01%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid having a size ≤150 meshes, a coating basic weight is 8 g/cm² and a covering area is ≥95%; absolutely drying the base paper, and obtaining a coated meta-aramid fiber base paper; and (7) soft calendering the coated meta-aramid fiber base paper with a temperature of 140° C. and a linear pressure of 150 kN/m, then high-temperature calendering with a temperature of 290° C. and a linear pressure of 300 kN/m, and finally cold calendering with a temperature of 10° C. and a linear pressure of 60 kN/m; rewinding and slitting the calendered base paper, and obtaining a meta-aramid fiber paper-based material having a thickness of 5.0 mil.

Fourth Preferred Embodiment (1) mixing functional powders with a DMAC solution, and grinding a mixture of the functional powders and the DMAC solution; forming a suspension liquid which is uniformly dispersed; adding the suspension liquid into a first poly(m-phenylene isophthalamide) solution; and obtaining a mixed original liquid through a static mixer; wherein: the functional powders are bismuth oxides having a particle size smaller than 200 nm, and a total addition amount of the functional powders is 3% of a weight of poly(m-phenylene isophthalamide);

(2) processing the mixed original liquid through a dry spinning method, and respectively obtaining first meta-aramid chopped fibers (high-strength high-modulus fibers) having a length of 8 mm, a fineness of 2.0 D, and a modulus of 70 cN/dtex, and second meta-aramid chopped fibers (as-spun fibers) having a length of 2 mm, a fineness of 1.0 D, and a modulus of 55 cN/dtex; and, respectively relieving the first meta-aramid chopped fibers and the second meta-aramid chopped fibers until concentrations thereof are 0.3%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids with a weight proportion of 1:1:3:5; stirring the combined fibrids hydraulically, and relieving the fibrids until concentrations thereof are 0.2%;

(4) mixing the meta-aramid fibrids having a weight of 30% of a total absolute dry weight, the first meta-aramid chopped fibers having a weight of 55% of the total absolute dry weight, and the second meta-aramid chopped fibers having a weight of 15% of the total absolute dry weight; and obtaining a meta-aramid fiber mixed having a concentration of 0.3%;

(5) processing the meta-aramid fiber mixed pulp with a wet-papermaking process through an ultralow concentration inclined wire forming machine, wherein an ultrasonic process proceeds inside the forming machine, a processing power is 2000 W and an on-wire concentration is 0.01%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid having a size ≤150 meshes, a coating basic weight is 12 g/cm² and a covering area is ≥95%; absolutely drying the base paper, and obtaining a coated meta-aramid fiber base paper; and (7) laminating multiple layers of meta-aramid fiber base paper, wherein an inner surface is an uncoated meta-aramid fiber base paper and a surface layer is the coated meta-aramid fiber base paper; then, through humidifying until a water content reaches 30%, soft calendering, absolutely drying through a hot air pipe, high-temperature calendering, cold calendering, rewinding and slitting, obtaining a meta-aramid fiber paper-based material having a thickness of 6 mil, wherein: soft calendering proceeds with a temperature of 150° C. and a linear pressure of 150 kN/m; high-temperature calendering proceeds with a temperature of 300° C. and a linear pressure of 300 kN/m; and cold calendering proceeds with a temperature of 5° C. and a linear pressure of 80 kN/m.

In order to prepare the high-quality thick meta-aramid fiber paper-based material, the present invention firstly laminates the multiple layers of meta-aramid fiber base paper, then humidifies, and finally calenders. Because the fibers after drying are relatively hard, directly processing the fibers with calendering leads to a relatively weak bonding among the fibers, causing delamination and blistering. The present invention humidifies the laminated multiple layers of meta-aramid fiber base paper, the fibers after wetting expand, and the base paper has a loose bonding, which is beneficial to an interlayer bonding of the base paper. Moreover, during soft calendering, water serves as a heat transfer material, which enables the paper to be heated uniformly in a Z direction and avoids delamination and blistering problems caused by nonuniform heating inside the thick meta-aramid fiber paper-based material. Meanwhile, the method provided by the present invention leads to a more compact structure of the thick paper-based material, and obviously increases a mechanical strength and a dielectric strength thereof. Influences of humidifying and calendering on performance of the thick paper-based material are showed in Table 5.

TABLE 5

Influences of humidifying and calendering on performance of thick paper-based material

| | Thickness (mil) | MD tensile strength (N/cm) | MD elongation (%) | CD tearing strength (mN) | Dielectric strength (kV/mm) |
|---|---|---|---|---|---|
| Before improvement | 10 | 255 | 13.5 | 8000 | 27 |
| After improvement | 10 | 290 | 20.3 | 11000 | 34 |

Fifth Preferred Embodiment (1) mixing functional powders with a DMAC solution, and grinding a mixture of the functional powders and the DMAC solution; forming a suspension liquid which is uniformly dispersed; adding the suspension liquid into a first poly(m-phenylene isophthalamide) solution; and obtaining a mixed original liquid through a static mixer; wherein: the functional powders are titanium oxides and zirconium oxides, having a particle size smaller than 200 nm, the titanium oxides and the zirconium oxides are mixed with a weight proportion of 1:1, and a total addition amount of the functional powders is 3% of a weight of poly(m-phenylene isophthalamide);

(2) processing the mixed original liquid through a dry spinning method, and respectively obtaining first meta-aramid chopped fibers (high-strength high-modulus fibers) having a length of 8 mm, a fineness of 2.5 D, and a modulus of 80 cN/dtex, and second meta-aramid chopped fibers (as-spun fibers) having a length of 2 mm, a fineness of 1.0 D, and a modulus of 55 cN/dtex; and, respectively relieving the first meta-aramid chopped fibers and the second meta-aramid chopped fibers until concentrations thereof are 0.2%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids with a weight proportion of 2:3:4:1; stirring the combined fibrids hydraulically, and relieving the fibrids until concentrations thereof are 0.2%;

(4) mixing the meta-aramid fibrids having a weight of 65% of a total absolute dry weight, the first meta-aramid chopped fibers having a weight of 15% of the total absolute dry weight, and the second meta-aramid chopped fibers having a weight of 20% of the total absolute dry weight; and obtaining a meta-aramid fiber mixed pulp having a concentration of 0.2%;

(5) processing the meta-aramid fiber mixed pulp with a wet-papermaking process through an ultralow concentration inclined wire forming machine, wherein an ultrasonic process proceeds inside the forming machine, a processing power is 2500 W and an on-wire concentration is 0.015%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid having a size ≤150 meshes, a coating basic weight is 15 g/cm² and a covering area is ≥95%; absolutely drying the base paper, and obtaining a coated meta-aramid fiber base paper; and (7) laminating multiple layers of meta-aramid fiber base paper, wherein an inner surface is an uncoated meta-aramid fiber base paper and a surface layer is the coated meta-aramid fiber base paper; then, through humidifying until a water content reaches 20%, soft calendering, absolutely drying through a hot air pipe, high-temperature calendering, cold calendering, rewinding and slitting, obtaining a meta-aramid fiber paper-based material having a thickness of 20 mil, wherein: soft calendering proceeds with a temperature of 160° C. and a linear pressure of 180 kN/m; high-temperature calendering proceeds with a temperature of 330° C. and a linear pressure of 380 kN/m; and cold calendering proceeds with a temperature of 0° C. and a linear pressure of 50 kN/m.

Sixth Preferred Embodiment (1) mixing functional powders with a DMAC solution, and grinding a mixture of the functional powders and the DMAC solution; forming a suspension liquid which is uniformly dispersed; adding the suspension liquid into a first poly(m-phenylene isophthalamide) solution; and obtaining a mixed original liquid through a static mixer; wherein: the functional powders are titanium oxides, aluminum oxides, bismuth oxides, zirconium oxides, and palladium oxides, having a particle size smaller than 200 nm, the five oxides are mixed with a weight proportion of 1:1:1:1:1, and a total addition amount of the functional powders is 5% of a weight of poly(m-phenylene isophthalamide);

(2) processing the mixed original liquid through a dry spinning method, and respectively obtaining first meta-aramid chopped fibers (high-strength high-modulus fibers) having a length of 10 mm, a fineness of 2.5 D, and a modulus of 80 cN/dtex, and second meta-aramid chopped fibers (as-spun fibers) having a length of 3 mm, a fineness of 1.0 D, and a modulus of 55 cN/dtex; and, respectively relieving the first meta-aramid chopped fibers and the second meta-aramid chopped fibers until concentrations thereof are 0.5%;

(3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids with a weight proportion of 2:3:4:1; stirring the combined fibrids hydraulically, and relieving the fibrids until concentrations thereof are 0.5%;

(4) mixing the meta-aramid fibrids having a weight of 15% of a total absolute dry weight, the first meta-aramid chopped fibers having a weight of 65% of the total absolute dry weight, and the second meta-aramid chopped fibers having a weight of 20% of the total absolute dry weight; and obtaining a meta-aramid fiber mixed pulp having a concentration of 0.5%;

(5) processing the meta-aramid fiber mixed pulp with a wet-papermaking process through an ultralow concentration inclined wire forming machine, wherein an ultrasonic process proceeds inside the forming machine, a processing power is 3000 W and an on-wire concentration is 0.02%; and, after squeezing and drying, obtaining a meta-aramid fiber base paper;

(6) coating the meta-aramid fiber base paper, wherein both of two sides of the meta-aramid fiber base paper are coated by a layer of meta-aramid fibrid having a size ≤150 meshes, a coating basic weight is 15 g/cm² and a covering area is ≥95%; absolutely drying the base paper, and obtaining a coated meta-aramid fiber base paper; and (7) laminating multiple layers of meta-aramid fiber base paper, wherein an inner surface is an uncoated meta-aramid fiber base paper and a surface layer is the coated meta-aramid fiber base paper; then, through humidifying until a water content reaches 10%, soft calendering, absolutely drying through a hot air pipe, high-temperature calendering, cold calendering, rewinding and slitting, obtaining a meta-aramid fiber paper-based material having a thickness of 30 mil, wherein: soft calendering proceeds with a temperature of 180° C. and a linear pressure of 200 kN/m; high-temperature calendering proceeds with a temperature of 350° C. and a linear pressure of 400 kN/m; and cold calendering proceeds with a temperature of 0° C. and a linear pressure of 100 kN/m.

According to the present invention, a type and a content of the functional powders are key factors for influencing an improvement effect of characteristics, such as an aging resistance and a flame retardancy, of the paper-based material. A high content of the functional powders decreases a fiber strength, and further damages the performance of the paper-based material. A low content of the functional powders is difficult to reach an expected improvement effect. An optimal content of the functional powders is 0.1-5% of the weight of the poly(m-phenylene isophthalamide).

According to the present invention, a content of the second meta-aramid chopped fibers is a key influence factor for increasing a mechanical strength of the paper-based material. The second meta-aramid chopped fibers are the as-spun fibers without being processed with hot stretching and setting, and have a low crystallinity. The second meta-aramid chopped fibers are able to be plastically deformed and melted under a high-temperature high-pressure condition, thereby bonding the high-strength high-modulus fibers and the fibrids. A low content of the second meta-aramid chopped fibers has a bad strength improvement effect. A high content of the second meta-aramid chopped fibers increases an overall hot shrinkage rate of the paper-based material, decreases a thermal stability of the paper-based material, and increase a production cost of tons of paper. An optimal content of the second meta-aramid chopped fibers is 10-20% of the total absolute dry weight.

According to the present invention, a coating basic weight and a size of the fibrids in a coating are important factors for influencing a surface smoothness of the paper-based material. A large size of the fibrids affects a dispersity of the fibers in the coating, which leads to a pulp ball occurring on a surface of the paper-based material after coating, and decreases the surface smoothness thereof. Through experiments, it is proved: when the size of the fibrids is ≤150 meshes, a dispersion effect of a liquid phase is optimal. Next, when the coating basic weight is too high, a hot shrinkage rate of a surface layer of the paper-based material during calendering is far smaller than an inner hot shrinkage rate of the paper-based material, causing a bending and rough paper and an easy-peel surface layer. A low coating basic weight is difficult to reach a coverage rate of the coating, causing a serious local fluff phenomenon. An optimal coating basic weight is 5-15 g/cm$^2$, and meanwhile a coverage rate is ≥95%.

According to the present invention, a humidification amount after laminating the multiple layers of meta-aramid fiber base paper is a key factor for preparing a thick meta-aramid fiber paper-based material. When the humidification amount is too low, the fibers are unable to fully expand, which decreases an interlayer bonding effect. When the humidification amount is too high, a time of a subsequent hot air drying process is greatly lengthened, a production efficiency is decreased, and a production cost is increased. An optimal humidification amount is 10-30%. Meanwhile, until the base paper is fully dried during the hot air drying process, the subsequent high-temperature calendering proceeds; otherwise, water is rapidly evaporated, causing bubbling on the surface of the paper-based material and even delamination.

According to the present invention, after the multi-stage classification of the meta-aramid fibrids, a recombination size and proportion are key factors for influencing the performance of the paper-based material. The size and the proportion of the fibrids directly determine an average length of the fibrids. A large average length of the fibrids is beneficial to increasing a mechanical strength of a finished paper, but the finished paper is difficult to be compact and a dielectric property is damaged. A relatively small average length of the fibrids increases the dielectric property of the finished paper, but decreases the mechanical performance. Thus, through synthesizing the overall performance of the paper-based material, it is optimal that the meta-aramid fibrids respectively having the size of ≤30 meshes, 30-50 meshes, 50-100 meshes, and 100-150 meshes are combined with a weight proportion of (0-2):(1-3):(3-7):(1-5).

The meta-aramid fiber based-paper material prepared through the present invention has a thickness in a range of 1.5-30 mil, a high whiteness, a smooth and even surface, excellent characteristics of mechanical strength, dielectric property, aging resistance and flame retardancy, and a good performance stability, which meets development requirements of a modern industry and has a wide market prospect.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for producing a meta-aramid fiber paper-based material, comprising steps of:
   (1) mixing powders with a dimethylacetamide (DMAC) solution, and grinding a mixture of the powders and the DMAC solution; adding the ground mixture into a first poly(m-phenylene isophthalamide) solution; and obtaining a mixed original liquid through a static mixer; wherein: the powders are metallic oxides, and metallic ions comprise at least one member selected from a group consisting of aluminum ions, titanium ions, palladium ions, zirconium ions, and bismuth ions; the powders have a particle size smaller than 200 nm; and a total addition amount of the powders is 0.1-5% of a weight of poly(m-phenylene isophthalamide);
   (2) processing the mixed original liquid through a dry spinning method, and respectively obtaining first meta-aramid chopped fibers having a length of 4-10 mm and a fineness of 1.5-2.5 D, and second meta-aramid chopped fibers having a length of 1-3 mm and a fineness of 0.5-1.0 D; and, respectively stirring the first meta-aramid chopped fibers and the second meta-aramid chopped fibers hydraulically until concentrations thereof are 0.05-0.5%;
   (3) processing a second poly(m-phenylene isophthalamide) solution in a settling machine, and obtaining meta-aramid fibrids; after refining, through a multi-stage classification, selecting the fibrids respectively having a size of ≤30 meshes, 30-50 meshes, 50-100 meshes, and 100-150 meshes, and combining the fibrids in proportion; and stirring the combined fibrids hydraulically until concentrations thereof are 0.05-0.5%;
   (4) mixing the meta-aramid fibrids having a weight of 15-65% of a total absolute dry weight, the first meta-aramid chopped fibers having a weight of 15-65% of the total absolute dry weight, and the second meta-aramid chopped fibers having a weight of 10-20% of the total absolute dry weight; and obtaining a meta-aramid fiber mixed pulp having a concentration of 0.05-0.5%;
   (5) processing the meta-aramid fiber mixed pulp with a wet-papermaking process through an ultralow concentration inclined wire forming machine, wherein an ultrasonic process proceeds inside the forming machine and an on-wire concentration is 0.005-0.02%; and, after squeezing and drying, obtaining a meta-aramid fiber base paper;
   (6) coating the meta-aramid fiber base paper, wherein both of two sides of the meta-aramid fiber base paper are coated by a layer of meta-aramid fibrid; absolutely drying the base paper, and obtaining a coated meta-aramid fiber base paper; and
   (7) processing the coated meta-aramid fiber base paper respectively with soft calendering, high-temperature calendering, and cold calendering, then rewinding and slitting the processed base paper, and obtaining a meta-aramid fiber paper-based material having a thickness of 1.5-5 mil; alternatively, laminating multiple layers of meta-aramid fiber base paper, wherein an inner layer is an uncoated meta-aramid fiber base paper and a surface layer is the coated meta-aramid fiber base paper, then humidifying, soft calendering, absolutely drying through a hot air pipe, high-temperature calendering, cold calendering, rewinding and slitting, and finally obtaining a meta-aramid fiber paper-based material having a thickness of 6-30 mil.

2. The method for producing the meta-aramid fiber paper-based material, as recited in claim 1, wherein the meta-aramid fibrids respectively having the size of ≤30 meshes, 30-50 meshes, 50-100 meshes, and 100-150 meshes are combined with a weight proportion of (0-2):(1-3):(3-7):(1-5).

3. The method for producing the meta-aramid fiber paper-based material, as recited in claim 1, wherein the first meta-aramid chopped fibers are high-strength high-modulus fibers with a modulus of 60-80 cN/dtex, and the second meta-aramid chopped fibers are as-spun fibers with a modulus of 30-55 cN/dtex.

4. The method for producing the meta-aramid fiber paper-based material, as recited in claim 1, wherein the ultrasonic process in the ultralow concentration inclined wire forming machine proceeds with a power of 800-3000 W.

5. The method for producing the meta-aramid fiber paper-based material, as recited in claim 1, wherein a coating basic weight is 5-15 g/cm$^2$, and a covering area is ≥95%.

6. The method for producing the meta-aramid fiber paper-based material, as recited in claim 1, wherein the meta-aramid fibrids for coating have a size ≤150 meshes.

7. The method for producing the meta-aramid fiber paper-based material, as recited in claim 1, wherein the laminated multiple layers of meta-aramid fiber base paper are humidified until a water content thereof is 10-30%.

8. The method for producing the meta-aramid fiber paper-based material, as recited in claim 1, wherein: soft calendering proceeds with a temperature of 80-180° C. and a linear pressure of 100-200 kN/m; high-temperature calendering proceeds with a temperature of 250-300° C. and a linear pressure of 200-400 kN/m; and cold calendering proceeds with a temperature of 0-20° C. and a linear pressure of 50-100 kN/m.

* * * * *